US006634758B2

(12) United States Patent
Preis et al.

(10) Patent No.: US 6,634,758 B2
(45) Date of Patent: Oct. 21, 2003

(54) VEHICLE HANDLEBAR MIRROR SYSTEM

(76) Inventors: Robert J. Preis, 3785 Church Rd., Ellicott City, MD (US) 21043; Nils Dennis, 3785 Church Rd., Ellicott City, MD (US) 21043

( * ) Notice: Subject to any disclaimer, the term of this patent is extended or adjusted under 35 U.S.C. 154(b) by 0 days.

(21) Appl. No.: 09/975,012

(22) Filed: Oct. 12, 2001

(65) Prior Publication Data
US 2003/0072093 A1 Apr. 17, 2003

(51) Int. Cl.[7] .............. G02B 5/08; G02B 5/10; G02B 7/182; B60R 1/02
(52) U.S. Cl. ............ 359/842; 359/872; 359/881; 359/868
(58) Field of Search ............. 359/842, 850, 359/855, 871, 872, 881, 868

(56) References Cited

U.S. PATENT DOCUMENTS

| 702,763 | A | | 6/1902 | Aurness |
|---|---|---|---|---|
| D247,292 | S | | 2/1978 | Brown |
| 4,135,788 | A | | 1/1979 | Sargis |
| 4,166,650 | A | * | 9/1979 | Saunders, IV |
| 4,380,369 | A | * | 4/1983 | Schacht |
| 4,715,681 | A | | 12/1987 | Johnson |
| 4,826,306 | A | | 5/1989 | Grissen et al. |
| D365,073 | S | * | 12/1995 | Nagano |
| 5,644,439 | A | * | 7/1997 | Shiba ............... 359/842 |

FOREIGN PATENT DOCUMENTS

| DE | 3923706 | * | 1/1991 | ........... 359/842 |
|---|---|---|---|---|
| DE | 4444246 | * | 7/1995 | ........... 359/842 |
| EP | 0765798 | * | 4/1997 | ........... 359/842 |
| EP | 0936135 | * | 8/1999 | ........... 359/842 |
| FR | 2233825 | * | 2/1975 | ........... 359/842 |
| FR | 2707243 | * | 1/1995 | ........... 359/842 |
| GB | 735168 | * | 8/1955 | ........... 359/842 |
| GB | 793327 | * | 4/1958 | ........... 359/842 |
| GB | 844056 | * | 8/1960 | ........... 359/842 |
| GB | 877760 | * | 9/1961 | ........... 359/842 |
| GB | 888178 | * | 1/1962 | ........... 359/842 |
| JP | 2001-10575 | * | 1/2001 | ........... 359/842 |

* cited by examiner

*Primary Examiner*—Ricky D. Shafer
(74) *Attorney, Agent, or Firm*—Rosenberg, Klein & Lee

(57) ABSTRACT

A vehicle handlebar mirror system (10) is provided having a flexible securement member (40) received within a bore (30) of the vehicle handlebar (12). A flexible securement member (40) has a mirror member (20) removably mounted in it for providing a rider of the bicycle with appropriate rear and side views. A second end (46) of the flexible securement member (40) receives an expanding plug member (50). The expanding plug member (50) frictionally engages both a second end (46) and an inner wall (32) of the handlebar (12). A fastener (60) threadedly engages both the flexible securement member (40) and the expanding plug member (50) thus maintaining position of flexible securement member (40) within handlebar (12).

8 Claims, 4 Drawing Sheets ured within a bore of a conventional handlebar used on such vehicles. More particularly, the flexible securement member has a mirror member mounted thereon, allowing a rider of the vehicle to have appropriate side and rear views for additional safety and comfort.

Further, the flexible securement member has a recess formed therein with the recess receiving an expanding plug member. The expanding plug member makes frictional contact with both the flexible securement member and an inner wall of the vehicle handlebar. Additionally, a fastening element threadedly engages both the flexible securement member and the expanding plug member. Thus, the expanding plug member acts to anchor the flexible securement member within the vehicle handlebar. The flexible securement member is rotatable for positioning and is held within the handlebar by the expanding plug member.

2. Prior Art

Bicycle and other vehicle handlebar systems having attached mirror members are known in the art. In general, such prior art handlebar systems include some type of plug member received within a bore of the bicycle or vehicle handlebar. In many instances, the problems of such prior art vehicle handlebar systems are that the plugs within the vehicle handlebars are not easily removable and easily positionable. It is a purpose of the subject invention to provide a combination of elements making up a vehicle handlebar mirror system which allows for ease of removability and ease of positionability of the vehicle handlebar system with respect to the conventional vehicle handlebar.

One such prior art handlebar mirror system is shown in U.S. Pat. No. 4,135,788. This reference is directed to a cycle handlebar rearview mirror assembly. The system includes an insert member received within a conventional bicycle handlebar. This system relies purely on the frictional engagement between the plug member and the interior of the bicycle handlebar to maintain the mirror system in position. The bicycle handlebar system does not include a secondary expanding plug member, allowing for the anchoring of the primary plug member within the handlebar. The expanding plug member of the subject invention allows for firm securement of the bicycle handlebar system within the bicycle handlebar which overcomes this disadvantage.

Another such prior art bicycle handlebar system is shown in U.S. Pat. No. 702,763. This reference is directed to a bicycle mirror. This bicycle mirror system includes a mirror member positioned on a bicycle handlebar and held in place by the frictional engagement of a plug element within a bore of the handlebar. The system does not include a secondary plug member, which is important for both positioning and securement of the bicycle mirror within the handlebar.

U.S. Pat. No. 4,826,306 is directed to a compact rear view mirror for small vehicles. This system includes a mirror member which is affixed to the outside of a bicycle handlebar by means of a strap. The system does not include a mirror member affixed to a plug member to be received within the handlebar and does not provide for the added securement attained by the subject patent application system.

U.S. Pat. No. 4,715,681 is directed to a bicycle reflector for handlebar attachment. This system provides a mirror member affixed to a plug element, the plug element being received within a bore of the bicycle handlebar. The plug element, however, does not include a secondary plug element, allowing for further securement and positioning of the mirror with respect to the bicycle handlebar.

None of the prior art provides for a combination of elements forming a bicycle handlebar system having both a flexible securement member to be received within a bore of a bicycle handlebar and an expanding plug member, also making frictional contact with an inner wall of the bicycle handlebar. The expanding plug member allows for the anchoring of the flexible securement member within the handlebar and provides for additional positioning and securement capabilities of the bicycle handlebar system within the handlebar.

SUMMARY OF THE INVENTION

The present invention provides for a vehicle handlebar mirror system which may be mounted on a conventional bicycle handlebar. The handlebar mirror system includes a flexible securement member received within a bore of a conventional bicycle handlebar. On an exterior end of the flexible securement member is mounted a mirror member, allowing a rider of the vehicle convenient rear and side views access. The interior section of the flexible securement member makes contact with an inner wall of the handlebar and also has a recess formed therein. The recess receives an expanding plug member, which makes frictional contact with both the flexible securement member and an inner wall of the vehicle or bicycle handlebar. The flexible securement member and the expanding plug member are further joined by a fastener, which threadedly engages both. Thus, the expanding plug member anchors the flexible securement within the vehicle handlebar.

It is a principal objective of the vehicle handlebar mirror system to provide a mirror member for a bicycle, or other similar vehicle, to allow the rider rear and side view access for safety and convenience.

It is a further objective of the subject vehicle handlebar mirror system to provide a mirror assembly for attachment to a vehicle or bicycle handlebar which avoids bracket attachment, or other external attachment to the vehicle frame resulting in possible damage to the vehicle.

It is a further objective of the subject invention to provide a vehicle handlebar mirror system having an adjustable mirror assembly for the convenience of the rider.

It is a further objective of the subject vehicle handlebar mirror system to provide a flexible securement member, received within a bore of the handlebar, which is held in frictional engagement with the handlebar.

It is an important objective of the present invention to provide a vehicle handlebar mirror system having a secondary expanding plug member, which makes frictional contact with both the flexible securement member and an inner wall of the handlebar. Thus, the expanding plug member acts to anchor the flexible securement member within the vehicle handlebar.

DESCRIPTION OF THE PREFERRED EMBODIMENTS

Figure 1:
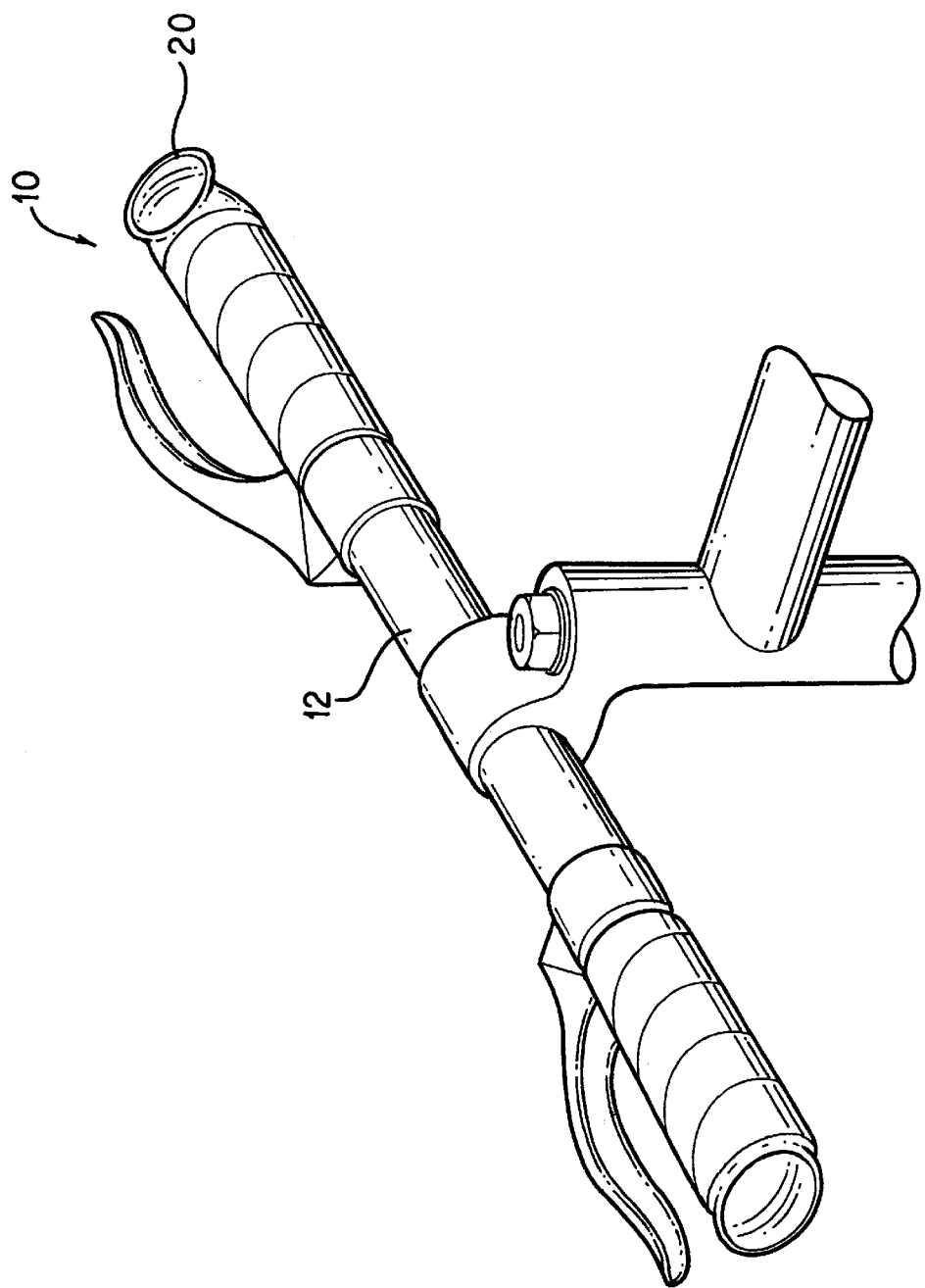
FIG. 1 is a perspective view of a vehicle handlebar mirror system mounted on a standard bicycle handlebar.

Referring now to FIG. 1, there is shown vehicle handlebar mirror system 10 mounted to standard bicycle handlebar 12. The bicycle handlebar system 10 includes a mirror member 20 allowing a rider of the bicycle to easily obtain rear and side views as he is riding.

Figure 1A:
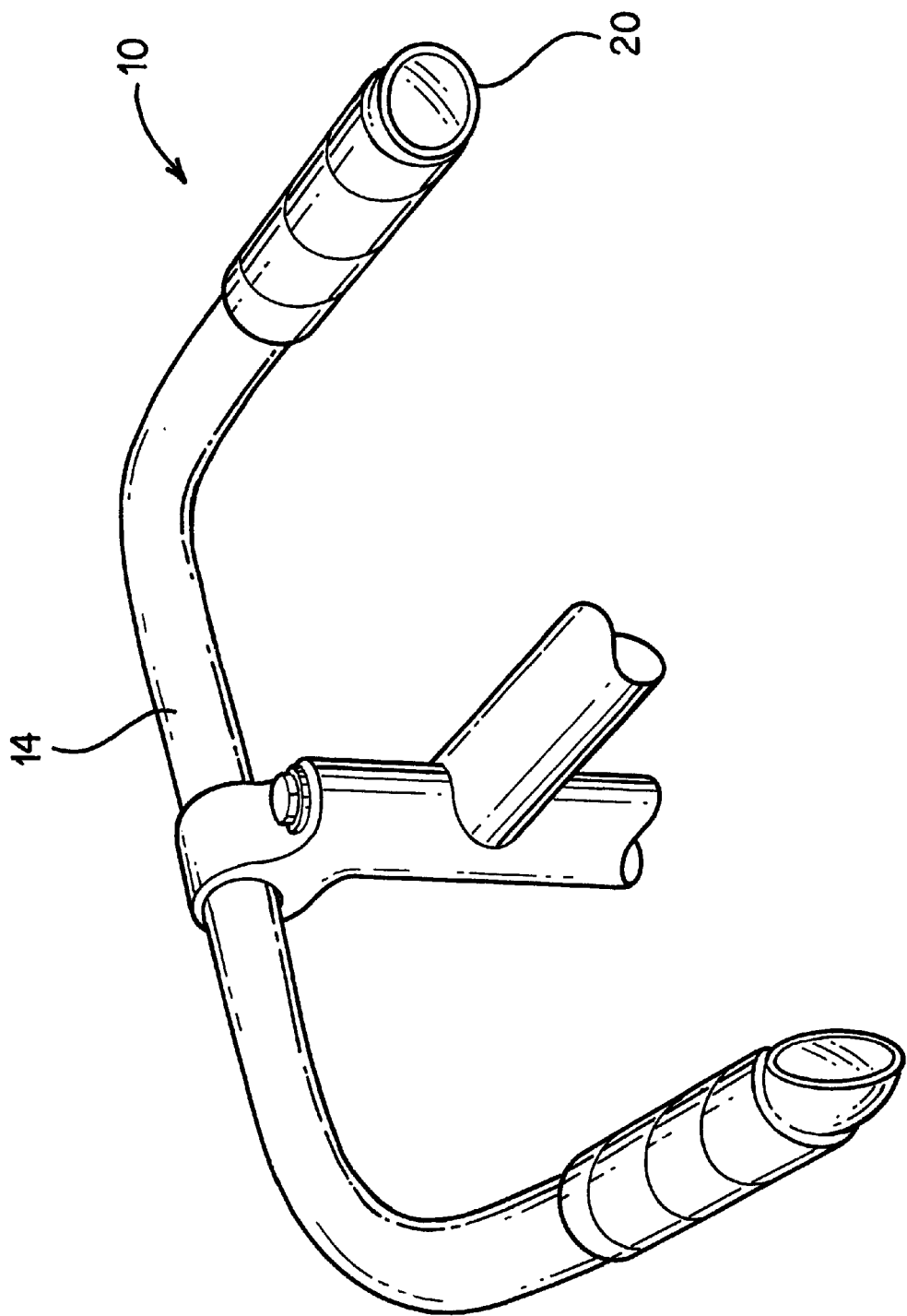
FIG. 1A is a perspective view of the vehicle handlebar mirror system mounted within a curved, racing-type bicycle handlebar.

FIG. 1A illustrates the vehicle handlebar mirror system 10 mounted on a curved, racing-type bicycle handlebar 14. The bicycle handlebar system may be used with all types of conventional bicycle handlebars or handlebars mounted on other types of vehicular conveyance. Such vehicles include tricycles, motorcycles, mopeds, dirt bikes, or any other type of vehicle requiring a handlebar for steering.

Figure 2:
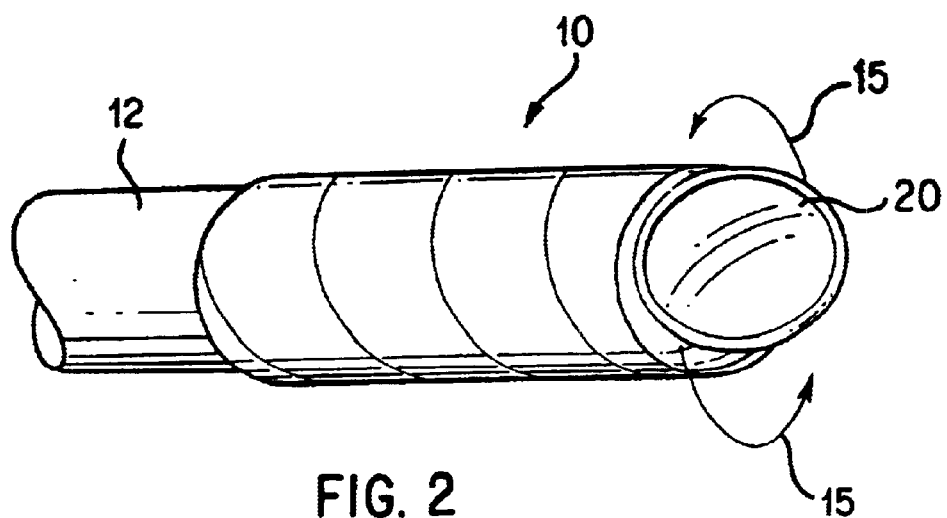
FIG. 2 is an enlarged view of one end of the vehicle handlebar having the bicycle handlebar mirror system mounted thereon.

As shown by the directional arrows 15 in FIG. 2, flexible securement member 40, having mirror member 20 mounted thereon, is rotatably adjustable within bore 30 of handlebar 12. Thus, a rider of the vehicle or bicycle may simply adjust mirror 20 to his or her needs by rotational activation of the system 10 and the frictional engagement between second end 46 and inner wall 32 will hold the flexible securement member 40, and consequently the mirror 20 in fixed position.

Figure 3:
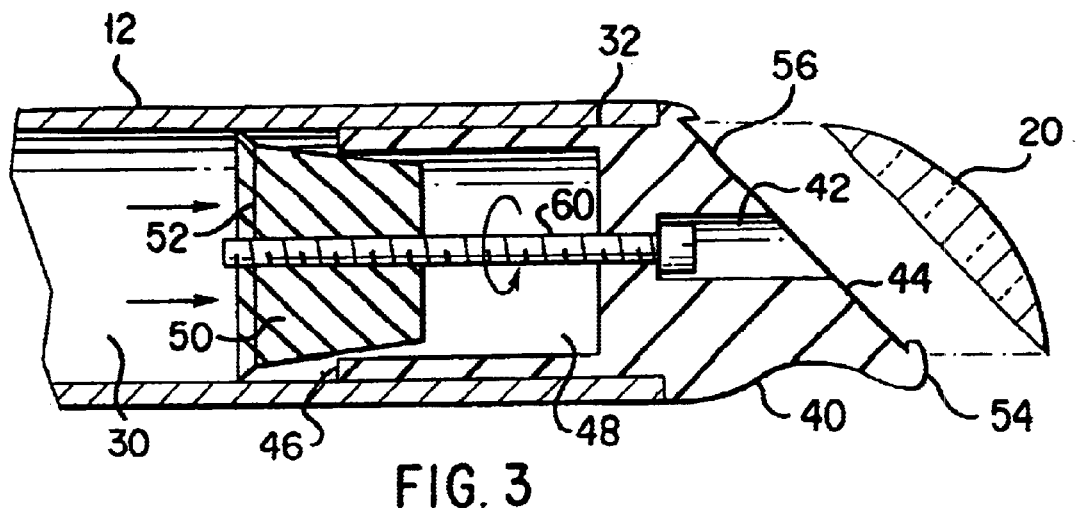
FIG. 3 is a cross-sectional view of the bicycle handlebar mirror system.

As seen in the cross-sectional view of FIG. 3, the vehicle handlebar mirror system 10 includes flexible securement member 40 received within bore 30 of handlebar 12. The flexible securement member 40 has opposing first end 44 and second end 46. The second end 46 is in direct frictional contact with inner wall 32 of bore 30. Thus, flexible securement member 40 is held in place within bore 30 by the frictional engagement between second end 46 and inner wall 32.

First end 44 of flexible securement member 40 has a raised rim 54. The raised rim 54 is formed along the circumference of first end 44 and receives mirror member 20. First end 44 defines a securement surface 56, which is angled with respect to the longitudinal axis of the handlebar 12. Thus, when mirror 20 is received within rim 54, it is angled in a manner that a rider of the vehicle may have appropriate rear and side views. Further, rim 54 on first end 44 allows for removable engagement of mirror 20 which allows for easy replacement.

A securement channel 42 is formed through first end 44 of flexible securement member 40. The securement channel 42 receives one end of a fastener 60. The other end of fastener 60 is received within plug channel 52 of expanding plug member 50. Fastener 60 may be in the form of a threaded bolt or other like mechanism for purposes to be described in following paragraphs.

As shown in FIG. 3, second end 46 of flexible securement member 40 includes a recess 48 formed therein. Recess 48 receives expanding plug member 50. Expanding plug member 50, as shown, frictionally engages both second end 46 and inner wall 32. Thus, expanding plug member 50 frictionally maintains the position of flexible securement member 40 within handlebar 12.

Expanding plug member 50 further has a plug channel 52 formed therethrough. Fastener 60 is received within both securement channel 42 and plug channel 52. Fastener 60 threadedly engages both expanding plug member 50 and flexible securement member 40. Expanding plug member 50, through frictional engagement with inner wall 32, acts as an anchor to fixedly position flexible securement 40 within handlebar 12.

Figure 3A:
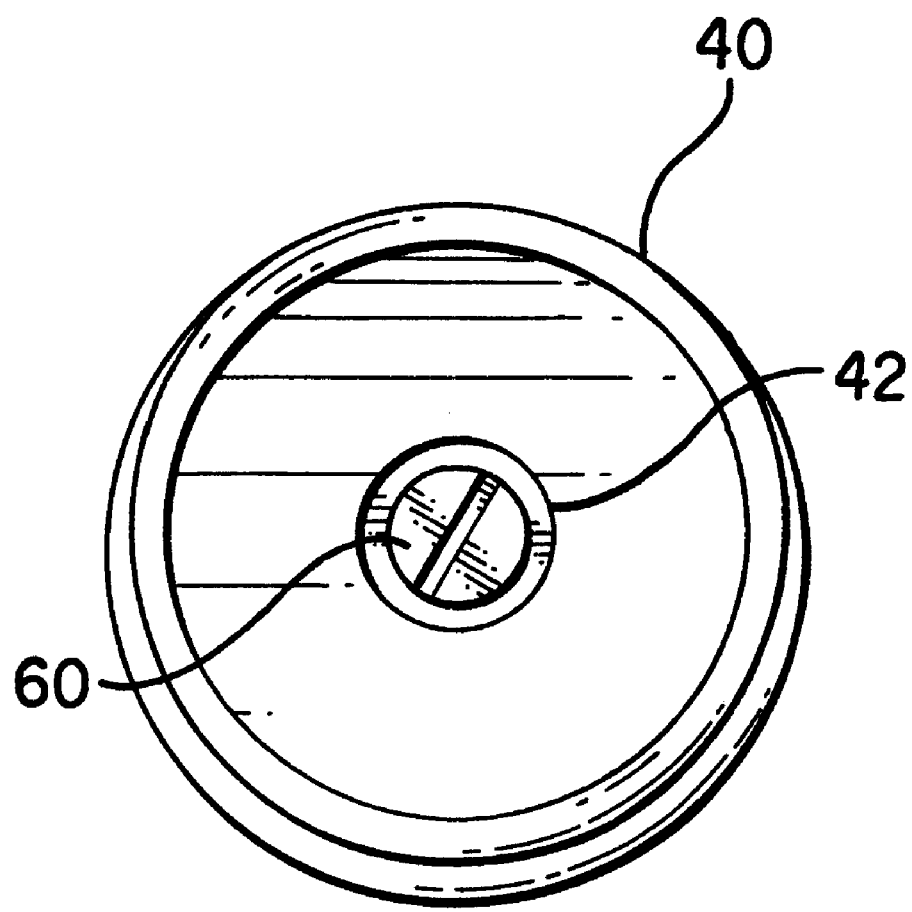
FIG. 3A is an end view of the bicycle handlebar mirror system.

As shown in the side view of FIG. 3A, when mirror member 20 is removed from flexible securement member 40, access to one end of fastener 60 is provided through securement channel 42. Thus, by removing mirror member 20, the fastener 60 may be easily tightened or loosened, allowing for adjustable positioning of flexible securement member 40 within bore 30 of handlebar 12.

The mirror member 20, illustrated in FIGS. 1–4, is shown as having a convex type mirror contour. Mirror member 20 may also be formed by a concave mirror contour or flat plane mirror depending on the rider's need.

The expanding plug member 50 serves to anchor the flexible securement member 40 within bicycle handlebar 12. Flexible securement member 50 allows for additional frictional engagement of the bicycle handlebar system 10 with handlebar 12 and allows for optimum positionability of flexible securement member 40 within bore 30 of handlebar 12.

Additionally, as shown in FIG. 3A, when the mirror member 20 is removed, the combination of flexible securement member 40, fastener 60, and expanding plug member 50 allows for ease and convenience in the removal or attachment of the handlebar mirror system 10.

As shown in FIGS. 2 and 3, mirror member 20 is received by rim 54 of flexible securement member 40. Thus, mirror member 20 is removably secured to flexible securement member 40. Mirror member 20 is positionable by rotation of flexible securement member 40 within handlebar 12, thus providing a more safe and stable reflective system than bicycle handlebar systems having the mirror member positionally displaced from the bicycle handlebar.

Figure 4:
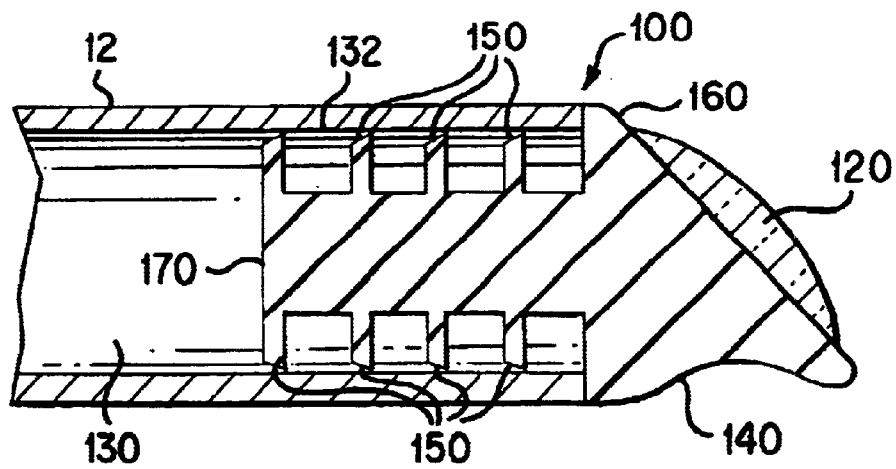
FIG. 4 illustrates a cross-sectional view of another embodiment of the bicycle handlebar system.

FIG. 4 illustrates another embodiment of the bicycle handlebar system. Vehicle handlebar mirror system 100 includes a flexible securement member 140 received within bore 130 of handlebar 12.

The flexible securement member 140 includes an exterior surface portion 160 and a central member 170. As shown in the Figure, exterior surface portion 160 defines a planar surface envelope which is angled with respect to a longitudinal axis of handlebar 12. Thus, when mirror member 120 is mounted on exterior surface portion 160, adequate side and rear views are provided to the rider of the bicycle.

Mirror member 120 is fixedly secured to exterior surface portion 160 through adhesive or some other permanent fixative. Mirror member 120 is shown as being a convex mirror, however, it may take the form of a concave mirror or a flat plane mirror depending on the rider's needs.

Central member 170 has a plurality of lug members 150 projecting therefrom. As shown, lug members 150 are in frictional engagement with inner wall 132 of the handlebar 12. Thus, flexible securement member 140 is held in place with respect to handlebar 12 by the frictional engagement of lug members 150 with inner wall 132.

Bicycle handlebar system 100 is rotatable within handlebar 12 similar to that described for bicycle handlebar mirror system 10 of FIG. 2. Additionally, flexible securement member 140 is removable from handlebar 12.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described without departing from the spirit or scope of the invention as defined in the appended claims.

What is claimed is:

1. A vehicle handlebar mirror system comprising:

a vehicle having a handlebar;

a mirror member;

means for fastening said mirror member within a bore of at least one portion of said handlebar, said means for fastening including a flexible securement member for frictionally engaging an inner wall defined by said bore, said flexible securement member having first and second ends, said mirror member being removably mounted to said first end of said flexible securement member, said flexible securement member having a securement channel formed therethrough, said second end of said flexible securement member defining a recess;

an expanding plug member received within said recess, said expanding plug member having a plug channel formed therethrough, said expanding plug contacting both said flexible securement member and said inner wall of said bore; and, a fastener received within both said securement channel and said plug channel, said fastener threadedly engaging both said flexible securement member and said expanding plug member, whereby said expanding plug, through frictional engagement with said inner wall of said bore, positionally maintains said flexible securement member within said bore.

2. The vehicle handlebar mirror system as recited in claim 1 wherein said mirror member is a convex mirror.

3. The vehicle handlebar mirror system as recited in claim 1 wherein said first end of said flexible securement member has a raised rim formed thereon for removably mounting said mirror member to said first end.

4. The vehicle handlebar mirror system as recited in claim 1 wherein said flexible securement member is rotatable within said bore for positioning said mirror member.

5. The vehicle handlebar mirror system as recited in claim 1 wherein said first end of said flexible securement defines a securement surface, said securement surface being angled with respect to a longitudinal axis of said handlebar.

6. The vehicle handlebar mirror system as recited in claim 1 wherein said handlebar is linearly directed.

7. The vehicle handlebar mirror system as recited in claim 1 wherein said handlebar is arcuately contoured.

8. The vehicle handlebar mirror system as recited in claim 1 wherein said flexible securement member is formed of a rubber composition.

* * * * *